United States Patent
Thiele

(10) Patent No.: US 8,485,587 B2
(45) Date of Patent: Jul. 16, 2013

(54) UPPER ROLLER ASSEMBLY FOR A SLIDING VEHICLE CLOSURE

(75) Inventor: Steven R. Thiele, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 13/329,683

(22) Filed: Dec. 19, 2011

(65) Prior Publication Data

US 2013/0154305 A1    Jun. 20, 2013

(51) Int. Cl.
*B60J 5/06* (2006.01)

(52) U.S. Cl.
USPC ........................................... 296/155

(58) Field of Classification Search
USPC ................ 296/155; 49/209, 213, 360
See application file for complete search history.

(56) References Cited

U.S. PATENT DOCUMENTS

| | | | |
|---|---|---|---|
| 3,242,535 A * | 3/1966 | Ferris | 49/218 |
| 4,157,846 A | 6/1979 | Whitcroft | |
| 4,268,996 A | 5/1981 | Allen | |
| 4,573,286 A * | 3/1986 | Favrel et al. | 49/214 |
| 4,606,146 A | 8/1986 | Jozefozak | |
| 5,809,834 A * | 9/1998 | Goldy | 74/89.22 |
| 5,832,668 A * | 11/1998 | Faubert et al. | 49/215 |
| 6,036,257 A | 3/2000 | Manuel | |
| 6,286,260 B1 * | 9/2001 | Grabowski | 49/216 |
| 6,286,261 B1 * | 9/2001 | Hackstock | 49/216 |
| 7,654,608 B2 | 2/2010 | Krajenke et al. | |
| 7,669,367 B2 * | 3/2010 | Shimura et al. | 49/213 |
| 7,703,242 B2 | 4/2010 | Goebel et al. | |
| 2010/0263283 A1 | 10/2010 | Yoshioka | |
| 2011/0089714 A1 | 4/2011 | Kitayama | |

FOREIGN PATENT DOCUMENTS

KR    20060042737    5/2006

OTHER PUBLICATIONS

Johnson Hardware. "200 Series Hardware for Open Pocket Single Door" [instruction manual] Sep. 2005.
International Search Report and Written Opinion of PCT/US2012/070245 dated Mar. 1, 2013.

* cited by examiner

*Primary Examiner* — H Gutman
(74) *Attorney, Agent, or Firm* — Rankin, Hill & Clark LLP

(57) ABSTRACT

An upper roller assembly for a sliding vehicle closure system includes a first bracket secured to a sliding vehicle closure. A ball-type roller is secured to the first bracket at a location spaced apart from the sliding vehicle closure for engaging and moving along an upper guide rail during opening and closing of the sliding vehicle closure. The ball-type roller is fixed in position relative to the sliding vehicle closure during opening and closing thereof. A second bracket is connected to first bracket. The second bracket is moveable relative to the sliding vehicle closure during opening and closing thereof. Guide rollers guide movement of the sliding vehicle closure during opening and closing thereof. The guide rollers are rotatably connected to the second bracket for engaging and moving along the upper guide rail during opening and closing of the sliding vehicle closure.

21 Claims, 9 Drawing Sheets

UPPER ROLLER ASSEMBLY FOR A SLIDING VEHICLE CLOSURE

BACKGROUND

Exemplary embodiments herein generally relate to a sliding vehicle closure system, and, more particularly, relate to an upper roller assembly arranged to move a sliding vehicle closure between a closed position and an open position.

Current vehicle slide door systems use three rails, namely, an upper guide rail, a center guide rail, and a lower guide rail, disposed horizontally along the vehicle for moving a sliding vehicle closure, such as a sliding side door of a vehicle, between an open position and a closed position. The upper and lower guide rails support upper and lower roller assemblies which guide the vehicle closure along a non-linear fixed path of travel defined by the upper and lower guide rails. One known roller assembly includes a main bracket mounted to the vehicle closure and a separate roller bracket rotatably mounted to a distal end of the main bracket. The roller bracket includes a pair of guide rollers rotatable about respective generally vertical axes. The guide rollers are received in an inverted U-shaped track for guided movement therealong as the vehicle closure is opened and closed. A support roller is also rotatably connected to the roller bracket. This roller rotates about a generally horizontally oriented axis and does not typically move within a track. Instead, this lower roller moves along a generally horizontally oriented surface of the vehicle body structure. As the vehicle closure is moved between its opened and closed positions and the guide rollers move along the track, the roller bracket rotates relative to the main bracket. Additionally, a cover is generally provided for the center guide rail to at least partially hide the center guide rail, but there is still a visible gap along the side of the vehicle body structure that can affect the styling image of the vehicle.

BRIEF DESCRIPTION

In accordance with one aspect, an upper roller assembly for a sliding vehicle closure system which is arranged to move a sliding vehicle closure between a closed position and an open position along an upper guide rail and a lower guide rail is provided. The upper roller assembly comprises a first bracket secured to the sliding vehicle closure. A ball-type roller is secured to the first bracket at a location spaced apart from the sliding vehicle closure for engaging and moving along the upper guide rail during opening and closing of the sliding vehicle closure. The ball-type roller is fixed in position relative to the sliding vehicle closure during opening and closing thereof. A second bracket is connected to first bracket. The second bracket is moveable relative to the sliding vehicle closure during opening and closing thereof. A plurality of guide rollers guide movement of the sliding vehicle closure during opening and closing thereof. The plurality of guide rollers is rotatably connected to the second bracket for engaging and moving along the upper guide rail during opening and closing of the sliding vehicle closure.

In accordance with another aspect, an upper sliding assembly for a sliding vehicle closure system comprises an upper rail extending along a vehicle body structure and an upper roller assembly. The upper roller assembly includes a first bracket secured to a sliding vehicle closure. A ball bearing unit is secured to the first bracket at a location spaced apart from the sliding vehicle closure. The ball bearing unit includes a ball-type roller for engaging and moving along the upper guide rail during opening and closing of the sliding vehicle closure. The ball-type roller is fixed in position relative to the sliding vehicle closure during opening and closing thereof. The ball-type roller supports the sliding vehicle closure relative to the vehicle body structure. A second bracket is connected to the ball bearing unit allowing the second bracket to rotate relative to the sliding vehicle closure during opening and closing thereof. A plurality of guide rollers guide movement of the sliding vehicle closure during opening and closing thereof. The plurality of guide rollers is rotatably connected to the second bracket for engaging and moving along the upper guide rail during opening and closing of the sliding vehicle closure. The plurality of guide rollers includes at least one guide roller rotatable about a generally horizontally oriented axis and at least one guide roller rotatable about a generally vertically oriented axis.

In accordance with yet another aspect, a sliding vehicle closure assembly for a vehicle comprises a sliding vehicle closure including a closure body. An upper guide rail is secured to a vehicle body structure for guiding the sliding vehicle closure during opening and closing thereof. The upper guide rail has an I-shaped cross-section including an upper flange, a lower flange and a web separating the upper and lower flanges. A first bracket extending from an upper portion of the closure body. A ball-type roller is secured to the first bracket for engaging and moving along the upper guide rail during opening and closing of the sliding vehicle closure. The ball-type roller is rotatable about a generally vertically oriented axis and is fixed in position relative to the sliding vehicle closure during opening and closing thereof. The ball-type roller supports the sliding vehicle closure on the upper guide rail relative to the vehicle body structure. A second bracket is positioned beneath the first bracket and is rotatable relative to the first bracket via a ball-bearing unit connected to the first bracket. A plurality of guide rollers guide movement of the sliding vehicle closure during opening and closing thereof. The plurality of guide rollers is rotatably connected to the second bracket for engaging and moving along the upper guide rail during opening and closing of the sliding vehicle closure. The ball-type roller engages and moves along the upper flange during opening and closing of the sliding vehicle closure. At least one guide roller engages and moves along the lower flange during opening and closing of the sliding vehicle closure, and at least one guide roller engages and moves along the web during opening and closing of the sliding vehicle closure. The upper guide rail includes an S-shaped offset section adapted to lift the sliding vehicle closure and move the sliding vehicle closure laterally from the vehicle body structure as the sliding vehicle closure is moved toward the open position.

DETAILED DESCRIPTION

It should, of course, be understood that the description and drawings herein are merely illustrative and that various modifications and changes can be made in the structures disclosed without departing from the present disclosure. In general, the figures of the exemplary sliding vehicle closure system are not to scale. It should be appreciated that the term "plurality" means "two or more", unless expressly specified otherwise. It will also be appreciated that the various identified components of the exemplary sliding vehicle closure system disclosed herein are merely terms of art that may vary from one manufacturer to another and should not be deemed to limit the present disclosure.

Figure 1:
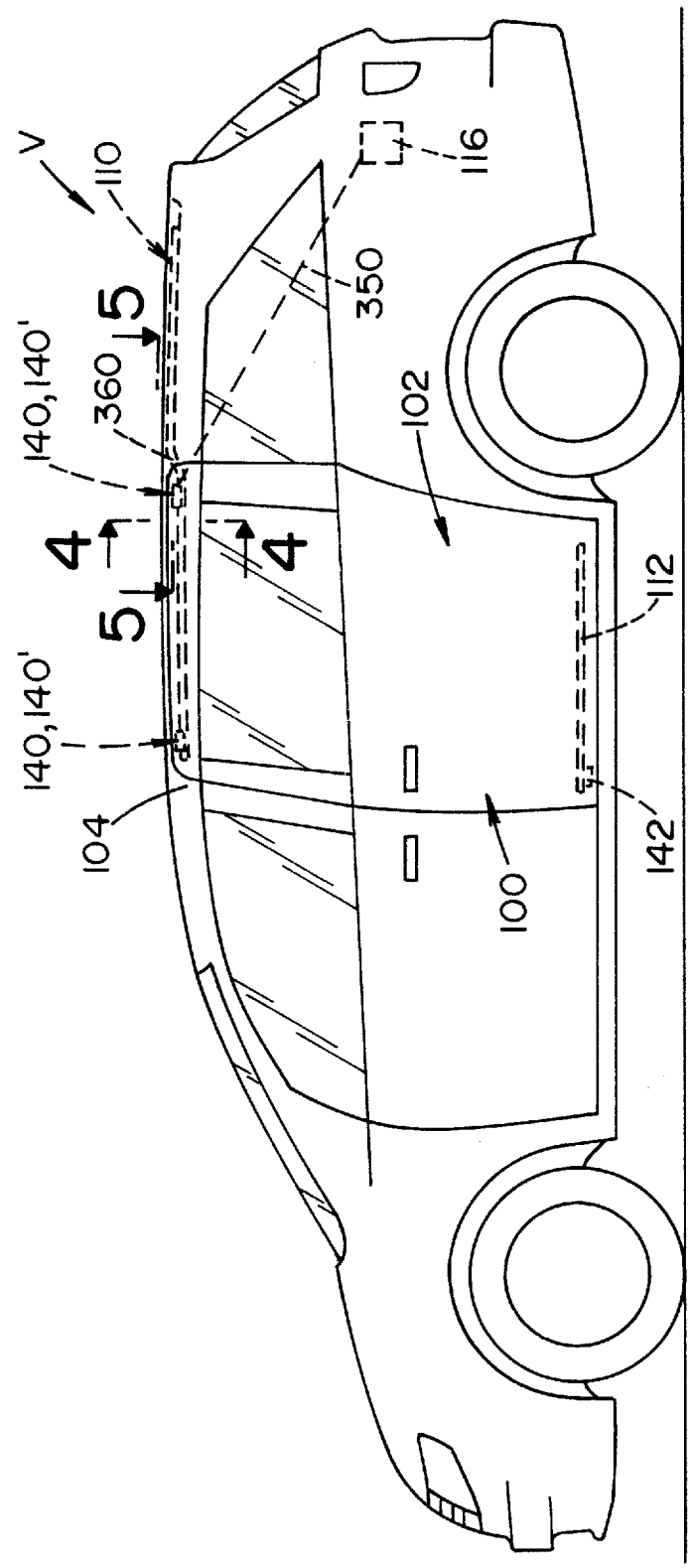
FIG. 1 is a side schematic view of a vehicle including a sliding vehicle closure system arranged to move a sliding vehicle closure between a closed position and an open position along an upper guide rail and a lower guide rail. As depicted, the sliding vehicle closure is in the closed position.
Figure 2:
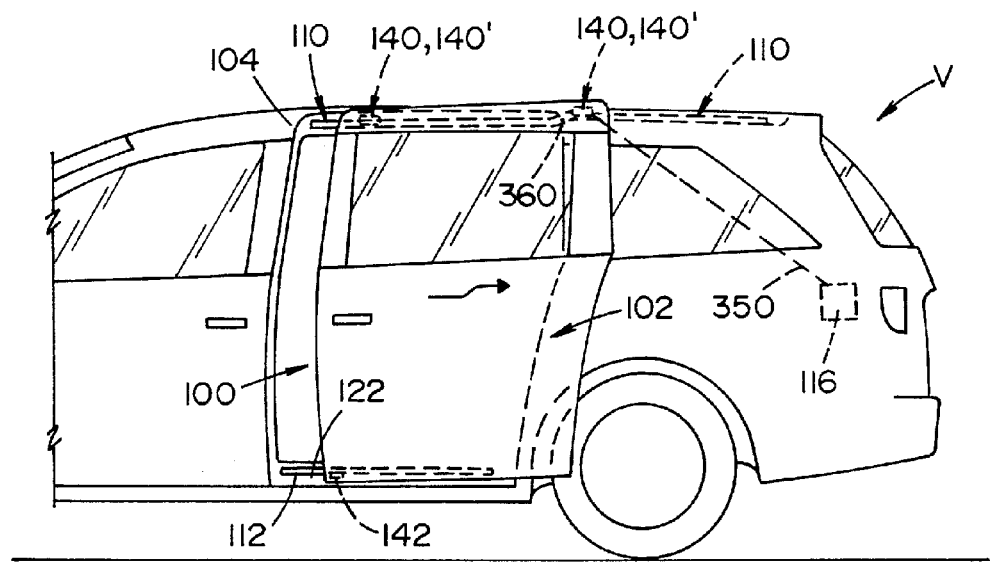
FIG. 2 is a partial side schematic view of the vehicle of FIG. 1 illustrating the sliding vehicle closure moving from the closed position toward the open position.
Figure 3:
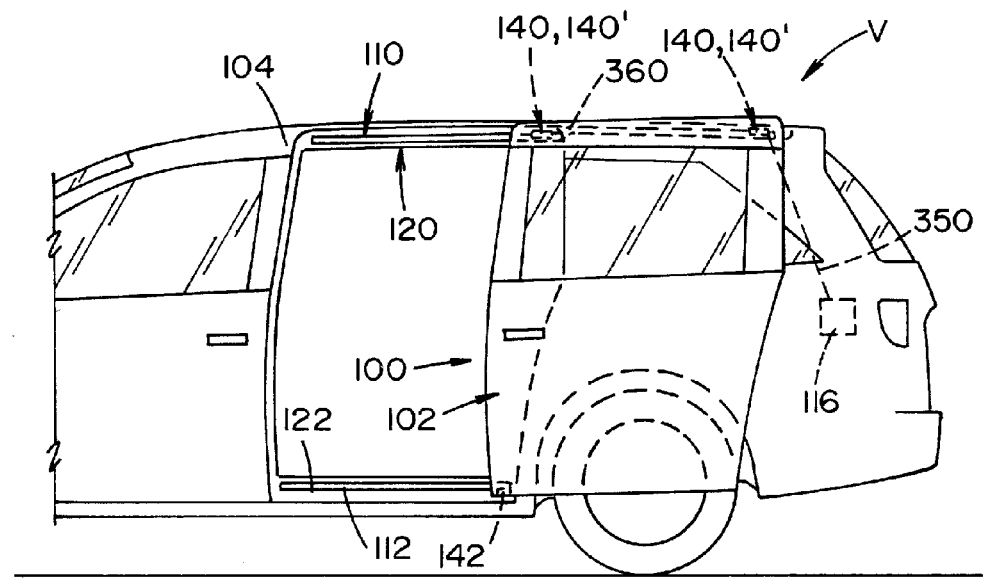
FIG. 3 is a partial side schematic view of the vehicle of FIG. 1 illustrating the sliding vehicle closure in the open position.

Referring now to the drawings, wherein like numerals refer to like parts throughout the several views, FIGS. 1-3 illustrate an exemplary sliding vehicle closure system 100 for a vehicle V according to the present disclosure. The sliding vehicle closure system 100 is arranged to move a sliding vehicle closure 102, such as a sliding side door of the vehicle, between a closed position and an open position in a front-to-rear direction of a vehicle side body structure 104 along an upper guide rail 110 and a lower guide rail 112. The vehicle closure 102 is movable between the open position where the vehicle closure 102 is moved toward a rearward direction of the vehicle V and the closed position where the vehicle closure 102 is moved from the open position in a forward direction of the vehicle V to close against a frame of the body structure 104. The sliding vehicle closure system 100 can be operably connected to a drive mechanism (shown schematically at 116) for opening and closing the vehicle closure 102. The vehicle closure 102 can also be actuated manually through pulling on a handle provided on the vehicle closure to open or close the vehicle closure.

Figure 4:
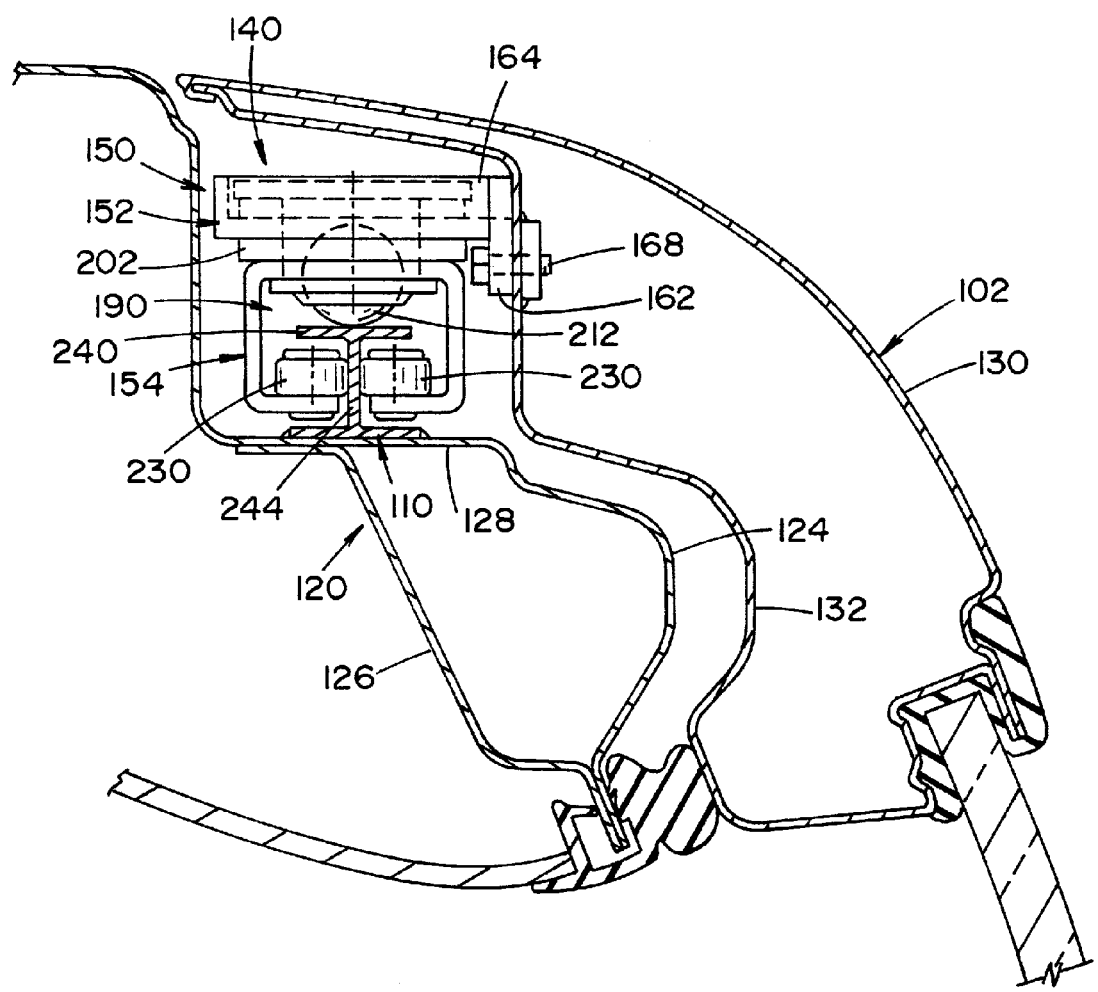
FIG. 4 is a cross-sectional view of the vehicle of FIG. 1 taken along line 4-4 of FIG. 1. As depicted, the sliding vehicle closure system includes an upper roller assembly according to one aspect of the present disclosure moveably engaged to the upper guide rail.
Figure 5:
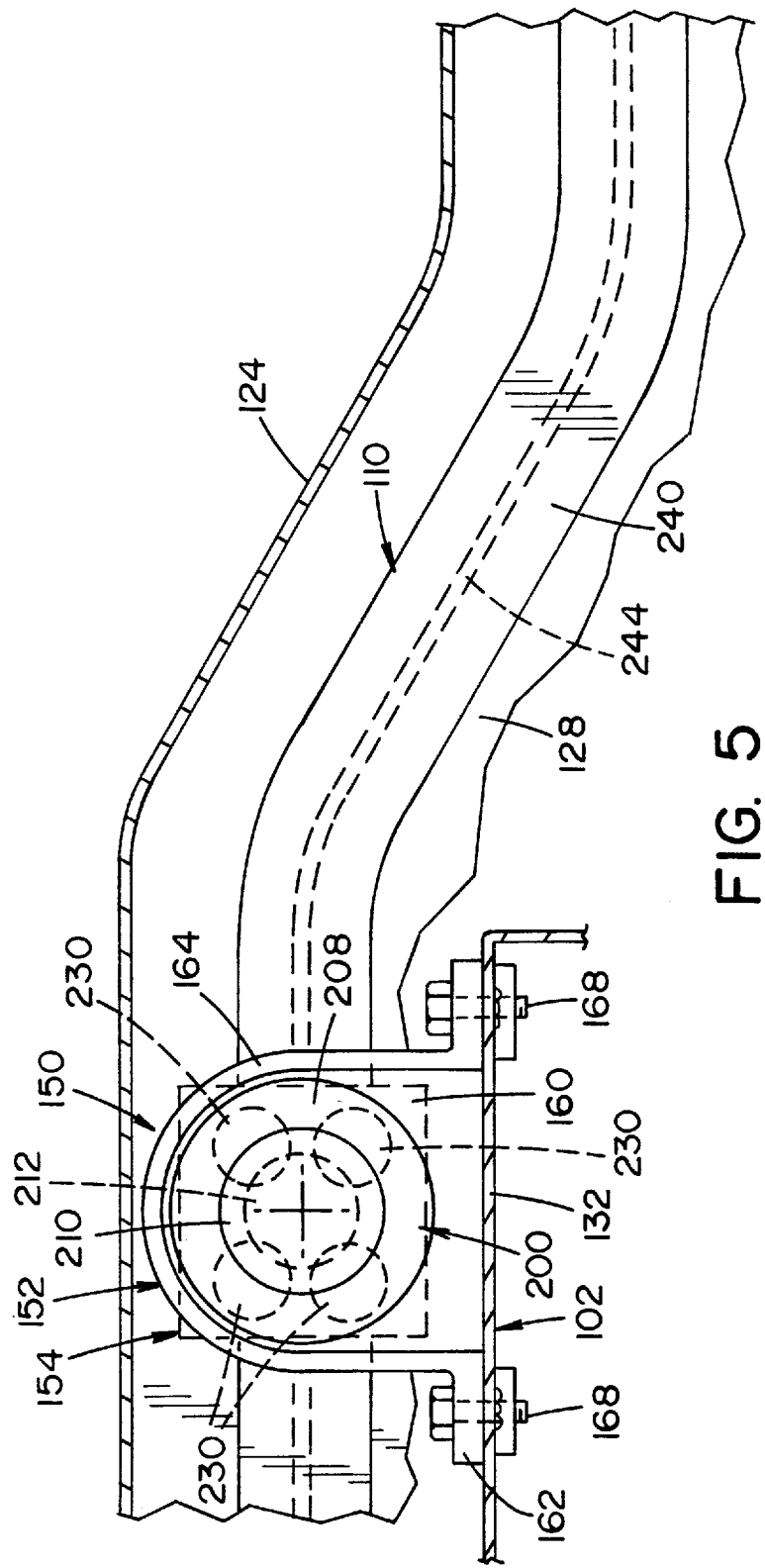
FIG. 5 is a cross-sectional view of the vehicle of FIG. 1 taken along line 5-5 of FIG. 1.

As indicated above, the sliding vehicle closure system 100 comprises the upper guide rail 110 and the lower guide rail 112. Each of the upper guide rail 110 and lower guide rail 112 extends in a front-to-rear direction of the vehicle side body structure 104 and is fixed to the side body structure 104 in any suitable manner, such as welding. For example, the upper guide rail 110 can be fixed to an upper side sill member 120, and the lower guide rail 112 can be fixed to a lower side sill member 122. As shown in FIG. 4, the upper side sill member 120 can include an outer panel 124 connected to an inner panel 126. The outer panel 124 includes an outboard lateral planar portion 128 to which the upper guide rail 110 can be fixedly secured. The vehicle closure 102 includes an outer door panel 130 and an inner door panel 132 connected to each other at each periphery. The inner panel 132 can constitute an inner wall of the vehicle interior. Each of the upper and lower guide rails 110,112 are appropriately shaped such that each guide rail generally conforms to the vehicle side body structure 104.

An upper sliding or roller assembly 140,140' is operatively associated with the upper guide rail 110 and is movable along the upper guide rail. A lower sliding or roller assembly 142 is operatively associated with the lower guide rail 112 and is movable along the lower guide rail. The upper and lower roller assemblies 140,140',142 guide the vehicle closure 102 in the front-to-rear direction of the vehicle. In contrast to a known sliding vehicle closure system, the exemplary sliding vehicle closure system 100 does not include a center guide rail, which improves the styling of the vehicle V, and therefore does not include a known middle link which is conventionally operatively connected to the drive mechanism 116. Accordingly, the drive mechanism 116 for the exemplary sliding vehicle closure system 100 is operatively connected to the one of the upper roller assembly 140,140' for opening and closing the vehicle closure 102.

With reference to FIGS. 4-8, the exemplary upper guide roller 140 of the sliding vehicle closure system 100 includes a bracket assembly 150 having a first bracket 152 and a separate second bracket 154. The first bracket 152 is fixed relative to the sliding vehicle closure 102 during opening and closing thereof, and includes a base member 160, a first flange 162 and a second flange 164 that extends about a portion of an outer periphery of the base member 160. The first flange 162 is secured to the outer door panel 130 of the vehicle closure 102 via fasteners, such as the illustrated bolts 168. Alternatively, the first flange 162 could be secured to a vehicle closure by other means, such as by welding. In addition, it is to be appreciated and understood by those skilled in the art that the first bracket 152 can take on other configurations and need not be constructed exactly as illustrated. For example, the first bracket 152 could be an arm extending from the vehicle closure 102 and could be integrally formed therewith. The second bracket 154 is generally tube-shaped and includes a top wall 170, side walls 172,174 and a bottom wall 176. The top wall 170 is connected to the base member 160 of the first bracket 152. The bottom wall 176 includes an elongated opening 178 extending along the entire length of the bottom wall and separates the bottom wall into a first section 180 and a second section 182.

Figure 6:
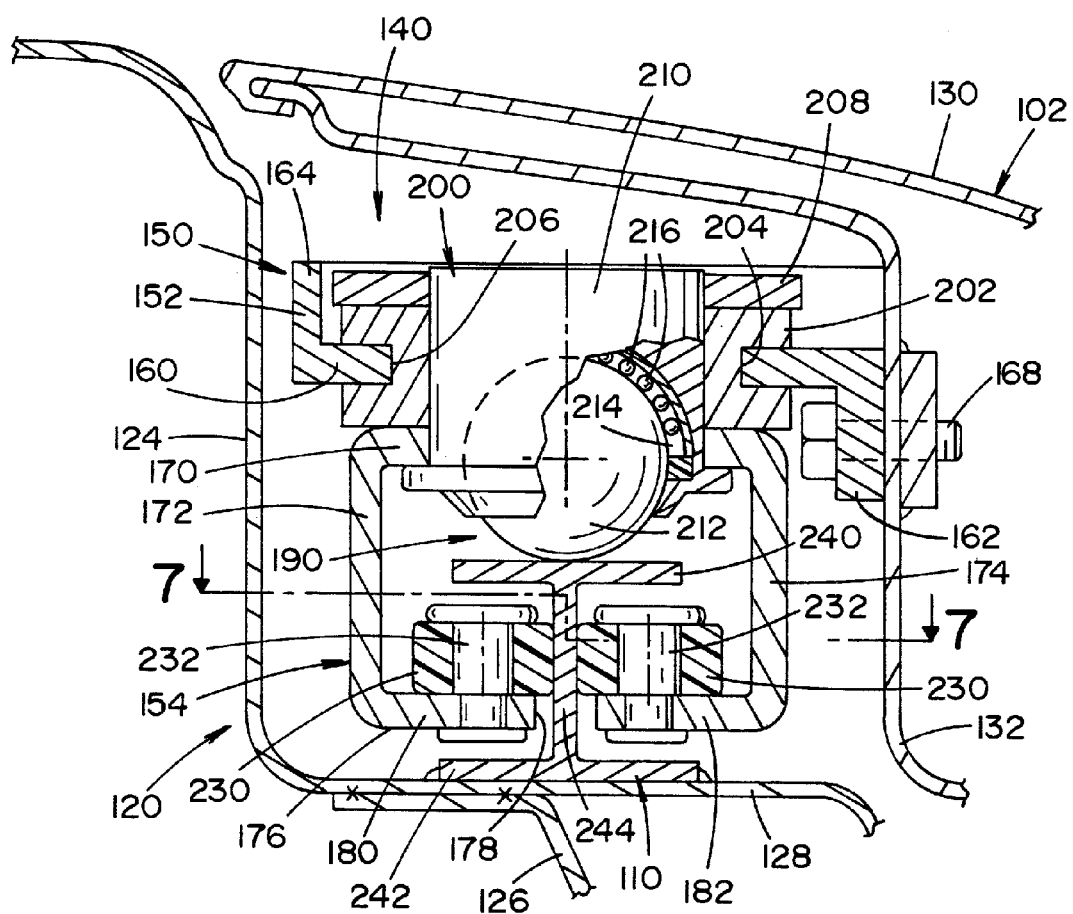
FIG. 6 is an enlarged cross-sectional view of the upper roller assembly of FIG. 4.

A ball-type roller 190 is secured to the first bracket 152 at a location spaced apart from the sliding vehicle closure 102 for engaging and moving along the upper guide rail 110 during opening and closing of the vehicle closure 102. For example, in the illustrated embodiment, the ball-type roller 190 is mounted adjacent a distal end of the first bracket 152 for supporting the sliding vehicle closure 102 on the upper guide rail 110 to which the vehicle closure 102 is mounted. The ball-type roller 190 is fixed in position relative to the sliding vehicle closure to which it is mounted via the first bracket 152, particularly during opening and closing thereof. The ball-type roller 190 of the upper roller assembly 140 can be a trackless ball-type roller that engages and moves along the corresponding upper guide rail 110 during opening and closing of the vehicle closure 102. In the depicted embodiment, the ball-type roller 190 is part of a ball bearing unit 200 mounted on the first bracket 152. As shown in FIG. 6, the ball bearing unit 200 includes a housing 202 having a circumferential groove 204. To mount the ball bearing unit to the first bracket 152, the housing 202 is positioned in an opening 206 provided in the base member 160, with a portion of the base member that defines the opening 206 being positioned in the groove 204. A washer 208 can be mounted to an upper portion of the housing 202. It should be appreciated that alternative manners for securing the ball-bearing unit 200 to the first bracket 152 are contemplated. For example, the ball bearing unit can be press-fit into the opening 206 or the housing 202 can be welded to the base member 206. The second bracket 154 is suspended generally beneath the ball-type roller 190 and is connected to the ball bearing unit 200. This allows the second bracket 154 to rotate relative to the first bracket 152 and move relative to the vehicle closure 102 during opening and closing thereof.

With particular reference to FIG. 6, the ball-type roller 190 can include a housing 210 coupled to the ball-bearing unit 200. A lower portion of the housing 210 is mounted to the second bracket 154. This allows the second bracket 154 to rotate relative to the first bracket 152. A ball member 212 can be received within a recess 214 defined by the housing 210 and a plurality of ball bearings 216 can be disposed between the housing 210 and the ball member 212. As shown, the ball member 212 engages the upper guide rail 110 and rolls along the upper guide rail during opening and closing of the vehicle closure 102. As indicated above, the ball-type roller 190 and its ball member 212 are non-movably mounted to the first bracket 152 so as to remain in a fixed position during opening and closing of the vehicle closure. By this arrangement, the ball-type roller 190 and its ball member 212 support the weight of the vehicle closure 102 relative to the vehicle side body structure 104.

Figure 7:
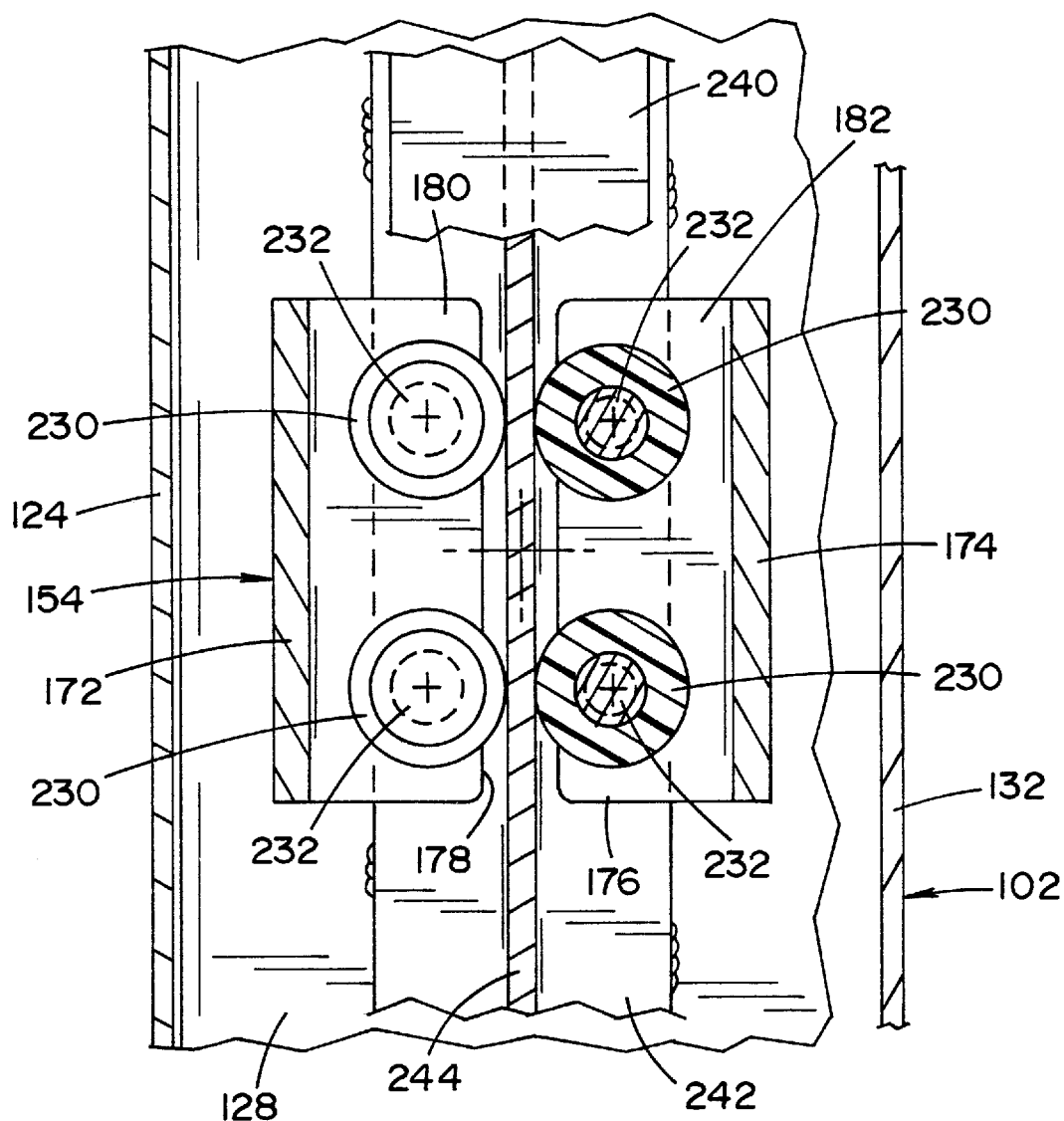
FIG. 7 is a cross-sectional view of the upper roller assembly of FIG. 6 taken along line 7-7 of FIG. 6.
Figure 8:
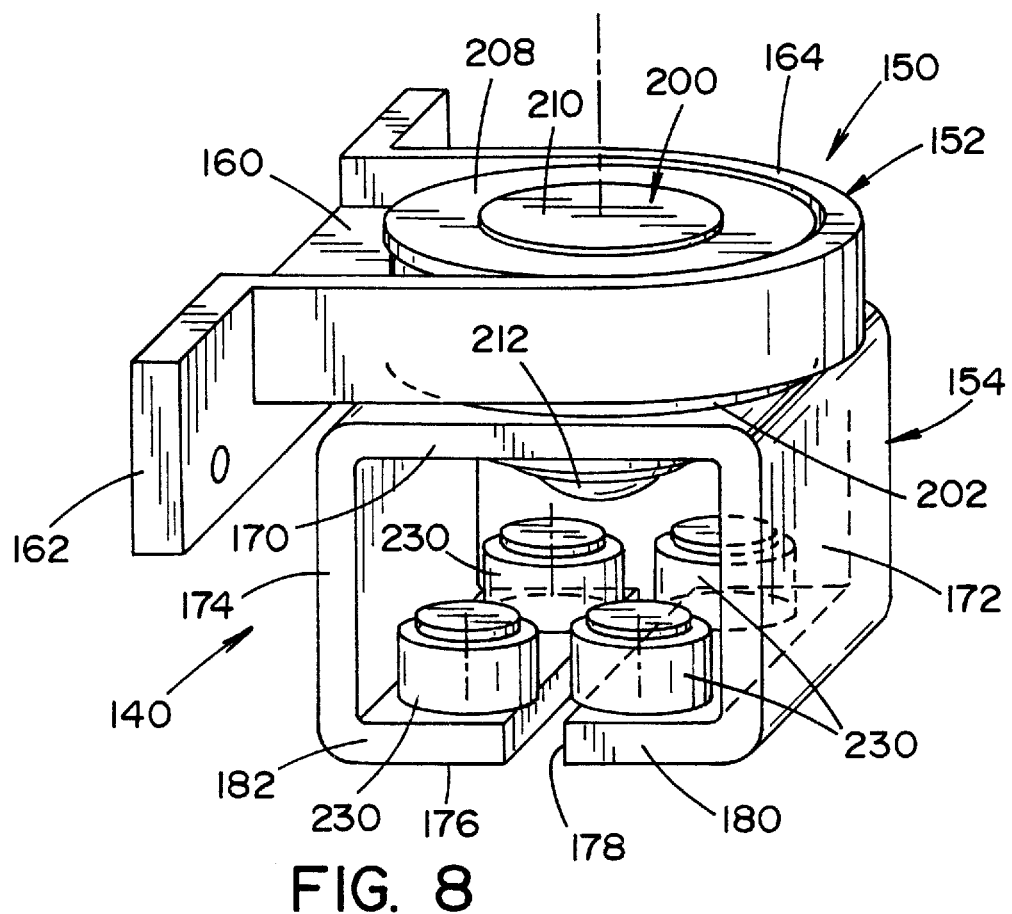
FIG. 8 is a perspective view of the upper roller assembly of FIG. 4.

The upper roller assembly 140 further includes a plurality of guide rollers 230 for guiding movement of the vehicle closure 102 during opening and closing thereof. The plurality of guide rollers 230 is rotatably connected to the second bracket 154 at a location spaced apart from the vehicle closure 102 and adjacent the ball-type roller 190. In the illustrated embodiment, the upper roller assembly 140 includes four spaced guide rollers 230; although, it should be appreciated that more or less than the depicted four guide rollers for the upper roller assembly 140 are contemplated. Each of the guide rollers 230 is rotatable about a generally vertical axis defined by a guide pin 232 connected to the second bracket 154, and is configured to engage and move along the upper guide rail 110 during opening and closing of the sliding vehicle closure 102. However, unlike the ball-type roller 190 which supports the weight of the vehicle closure 102, the plurality of guide rollers 230 guide movement of the vehicle closure 102 during opening and closing thereof without bearing any weight of the vehicle closure. In particular, the upper guide rail 110 is I-shaped in cross-section including an upper flange 240, a lower flange 242 and a web 244 separating the upper and lower flanges. The web 244 is received in the elongated opening 178 provided on the bottom wall 176 of the second bracket 154. Two of the guide rollers 230 are rotatably mounted to the first section 180 of the bottom wall 176 and the other two guide rollers 230 are rotatably mounted to the second section 182 of the bottom wall 176. With this configuration, the guide rollers 230 pinch the web 244 of the upper guide rail 110. As shown in FIGS. 4, 6 and 7, the ball-type roller 190 engages and moves along the upper flange 240 and each of the guide rollers 230 engages and moves along the web 244 during opening and closing of the sliding vehicle closure.

With reference to FIGS. 9-12, the exemplary upper guide roller 140' of the sliding vehicle closure system 100 includes a bracket assembly 250 having a first bracket 252 and a separate second bracket 254. The first bracket 252 is fixed relative to the sliding vehicle closure 102 during opening and closing thereof, and includes a base member 260, a first flange 262 and a second flange 264 that extends about a portion of an outer periphery of the base member 160. The first flange 262 is secured to the outer door panel 130 of the vehicle closure 102 via fasteners, such as the illustrated bolts 168. Alternatively, the first flange 262 could be secured to a vehicle closure by other means, such as by welding. The second bracket 254 is a multi-piece second bracket including a first member 270 connected to the first bracket 252, a second member 272 connected to a first end portion of the first member 270 and a third member 274 spaced apart from the second member 272 and connected to a second end portion of the first member 270. In the illustrated embodiment, the first member 270 has a U-shape, particularly an inverted U-shape, formed by an upper wall 276 and a pair of spaced apart side or lateral walls 278,280 depending downwardly from the upper wall. The second member 272 is L-shaped and is connected to side wall 278 of the first member 270 closest to the sliding vehicle closure 102. The third member 274 is also L-shaped, particularly backwards L-shaped, and is connected to the side wall 280 of the first member 270. The second and third members 272,274 can be secured to the first member 270 via fasteners, such as the illustrated bolts 282. According to one aspect, the second bracket 254 includes a pair of spaced apart third members 274 connected to the first member 270 and includes a fourth member 284 also connected to the first member and located between the pair of third members 274. Alternatively, the third member 274 can include a cutout and the fourth member 284 is connected to the first member 270 and positioned in the cutout. With this construction of the multi-piece second bracket 254, the upper roller assembly 140' can be easily secured to the upper guide rail 110.

Figure 10:
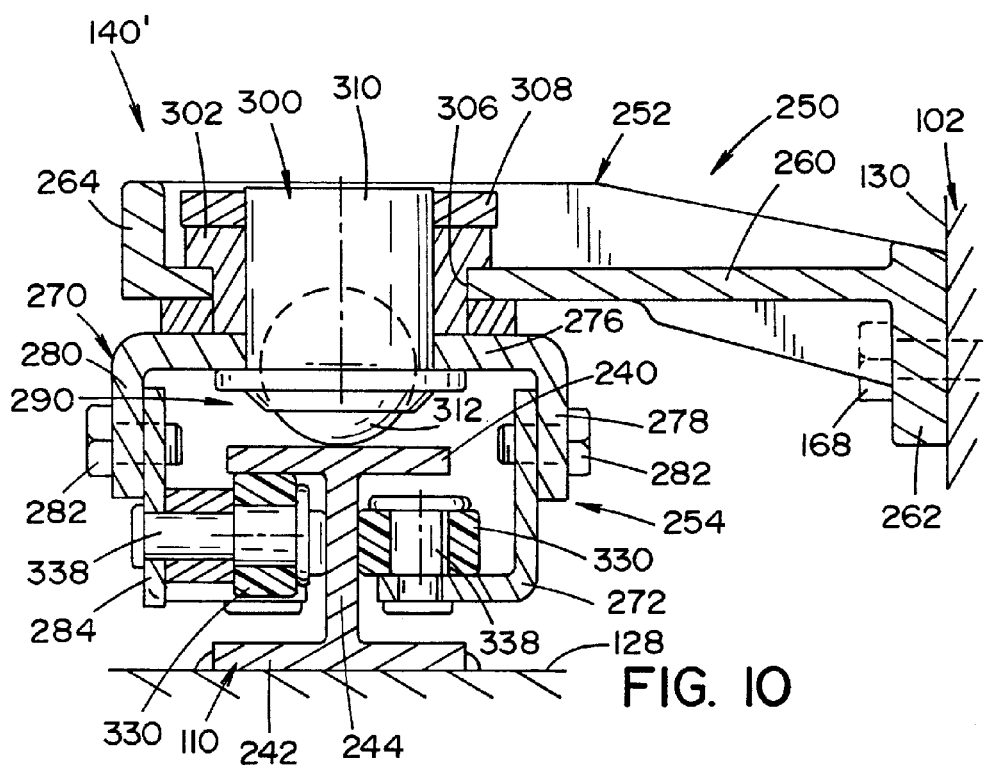
FIG. 10 is a cross-sectional view of the upper roller assembly of FIG. 9.
Figure 11:
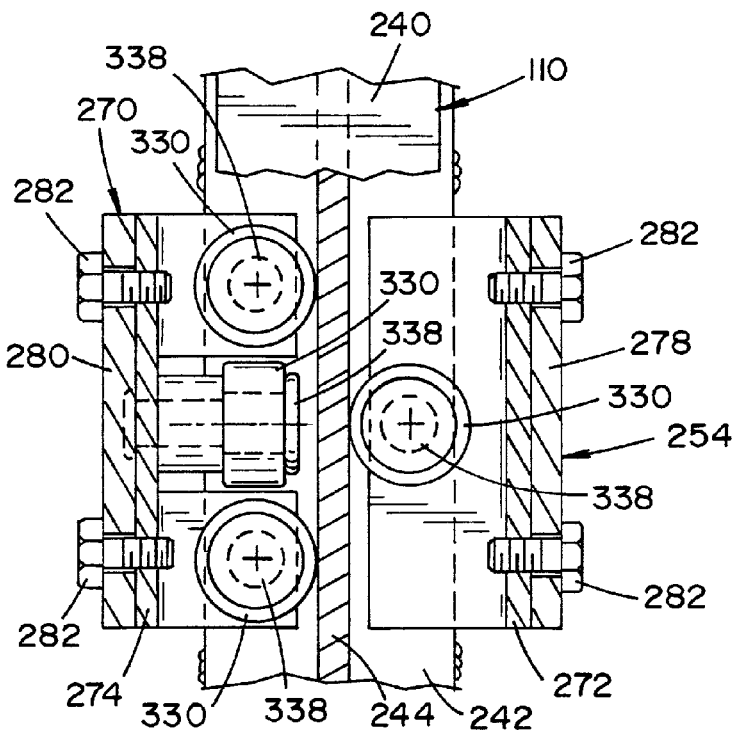
FIG. 11 is a cross-sectional view of the upper roller assembly of FIG. 9 taken along line 11-11 of FIG. 9.
Figure 12:
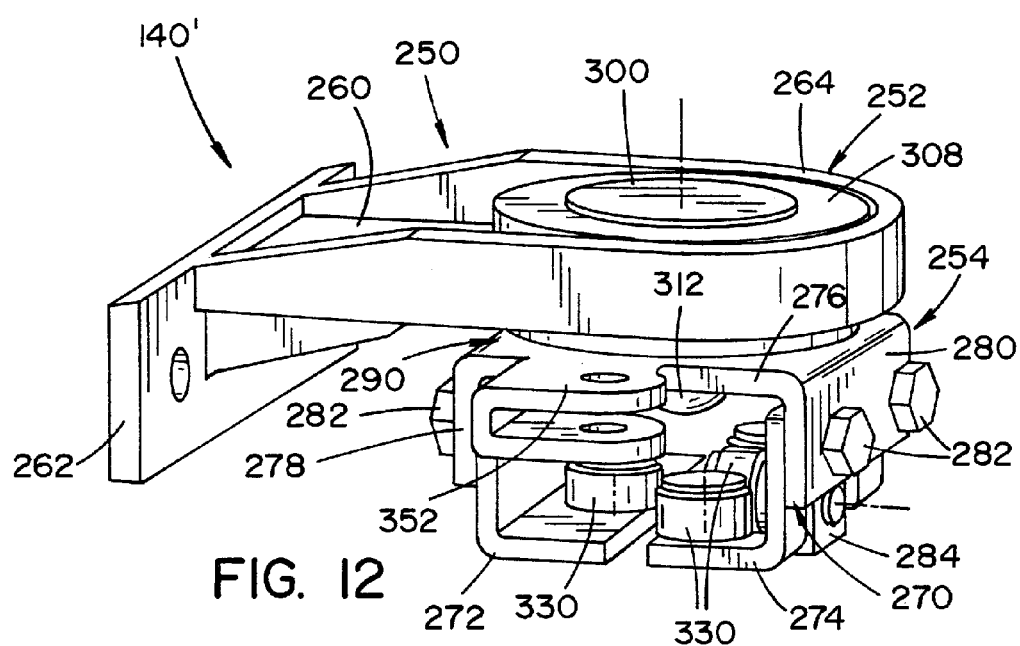
FIG. 12 is a perspective view of the upper roller assembly of FIG. 9.

Similar to upper roller assembly 140, upper roller assembly 140' includes a ball-type roller 290 secured to the first bracket 252 at a location spaced apart from the sliding vehicle closure 102 for engaging and moving along the upper guide rail 110 during opening and closing of the sliding vehicle closure 102. The ball-type roller 290 is fixed in position relative to the sliding vehicle closure to which it is mounted via the first bracket 252, particularly during opening and closing thereof, and supports the sliding vehicle closure 102 on the upper guide rail 110. The ball-type roller 290 is part of a ball bearing unit 300 mounted on the first bracket 152. As shown in FIG. 10, the ball bearing unit 300 includes a housing 302 positioned in an opening 306 provided in the base member 260. A washer 308 can be mounted to an upper portion of the housing 302. The second bracket 254 is suspended generally beneath the ball-type roller 290 and is connected to the ball bearing unit 300. Again, this allows the second bracket 254 to rotate relative to the first bracket 252 and move relative to the sliding vehicle closure 102 during opening and closing thereof.

With particular reference to FIG. 10, the ball-type roller 290 can include a housing 310 coupled to the ball-bearing unit 300. A lower portion of the housing 310 is mounted to the first member 270 of the second bracket 254. A ball member 312 can be received within the housing 310. As indicated above, the ball-type roller 290 and its ball member 312 are non-movably mounted to the first bracket 252 so as to remain in a fixed position during opening and closing of the vehicle closure 102. By this arrangement, the ball-type roller 290 and its ball member 312 support the vehicle closure 102 relative to the vehicle side body structure 106.

The upper roller assembly 140' further includes a plurality of guide rollers 330 for guiding movement of the sliding vehicle closure 102 during opening and closing thereof. The plurality of guide rollers 330 provided beneath the ball-type roller 290 is rotatably connected to the second bracket 254 via guide pins 338. The plurality of guide rollers 330 include at least one guide roller rotatable about a generally horizontally oriented axis and at least one guide roller rotatable about a generally vertically oriented axis. In the exemplary embodiment, the upper roller assembly 140' includes four spaced guide rollers 330; although, it should be appreciated that more or less than the depicted four guide rollers for the upper roller assembly are contemplated. Each of the guide rollers 330 is configured to engage and move along the upper guide rail 110 during opening and closing of the sliding vehicle closure 102. At least one guide roller 330 engages and moves along one of the upper flange 240 and lower flange 242 of the upper guide rail 110 during opening and closing of the sliding vehicle closure 102, and at least one guide roller engages and moves along the web 244 of the upper guide rail during opening and closing of the sliding vehicle closure. More particularly, at least one guide roller 330 engages and moves along one of the upper flange 240, at least one guide roller 330 engages and moves along a first surface of the web 244, and at least one guide roller 330 engages and moves along a second surface of the web 244 during opening and closing of the sliding vehicle closure 102.

Figure 9:
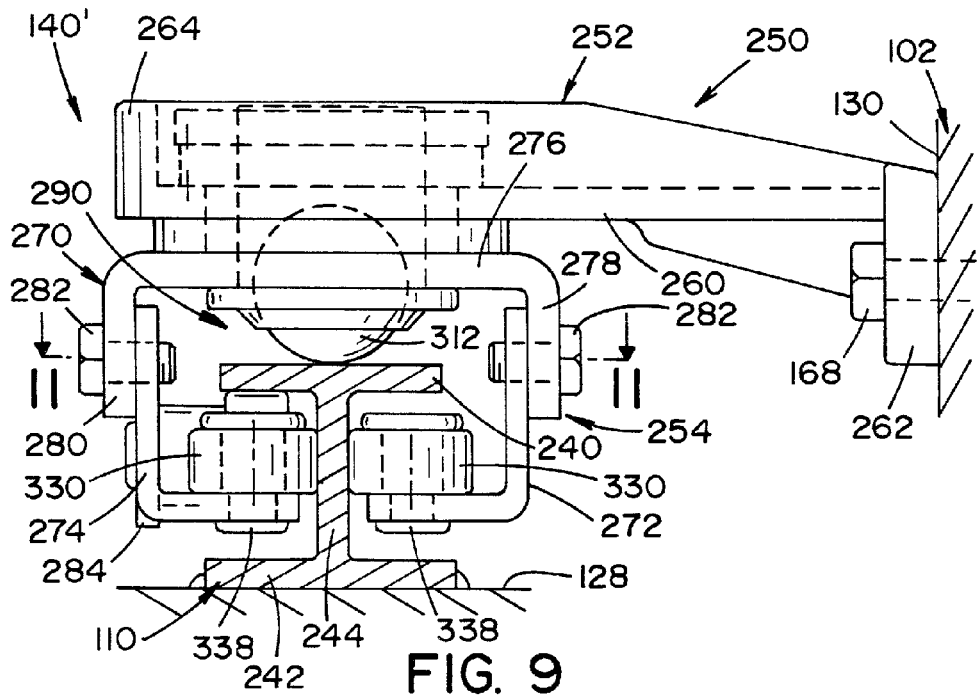
FIG. 9 is a side view of an upper roller assembly according to another aspect of the present disclosure for the sliding vehicle closure system of FIG. 1 moveably engaged to the upper guide rail.

Specifically, as shown in FIGS. 9-12, at least one guide roller 330 is rotatably connected to the second member 272 and at least one guide roller 330 is rotatably connected to the third member 274. As depicted, regarding the three guide rollers 330 that are rotatable about generally vertically oriented axes, two of those guide rollers have their axes aligned in a common plane and the third guide roller has its axis offset from the common plane. The guide roller 330 rotatable about the generally horizontally oriented axis is positioned between the two guide rollers 330 having their axes aligned in the common plane. In particular, one of the guide rollers 330 rotatable about the generally vertically oriented axis is mounted on the second member 272 and the remaining guide rollers 330 rotatable about the generally vertically oriented axes is mounted on the third member 274. More particularly, for the embodiment of the upper roller assembly 140' having a pair of third members 274, each third member has a guide roller 330 rotatable about the generally vertically oriented axis connected thereto. For the embodiment of upper roller assembly 140' having the third member 274 with a cutout, that third member has a pair of guide roller 330 rotatable about the generally vertically oriented axis connected thereto, one guide roller on each side of the cutout. At least one guide roller 330 is also rotatably connected to the fourth member 284. However, the guide roller 330 mounted to the fourth member 284 is rotatable about the generally horizontally oriented axis. As shown in FIGS. 9 and 10, the ball-type roller 290 engages and moves along the upper flange 240 during opening and closing of the sliding vehicle closure 102. Each of the guide rollers 330 rotatable about the generally vertically oriented axis engages and moves along the web 244 during opening and closing of the sliding vehicle closure 102. The guide roller 330 rotatable about the generally horizontally oriented axis engages and moves one of the upper flange 240 and lower flange 242. As illustrated, this guide roller connected to the fourth member 284 engages an underside of the upper flange 240. Again, unlike the ball-type roller 290 which supports the weight of the vehicle closure 102, the plurality of guide rollers 330 guide movement of the sliding vehicle closure 102 during opening and closing thereof without bearing any weight of the sliding vehicle closure.

As indicated previously, to open the vehicle door 102, the drive mechanism 116 can be actuated causing the sliding closure 102 to translate along the vehicle side body structure 104 via movement of the upper roller assembly 140,140' and the lower roller assembly 142 on the respective upper guide rail 110 and lower guide rail 112. In contrast to known sliding vehicle closure systems, the exemplary sliding vehicle closure system 100 does not include a middle guide rail and corresponding middle link to move the vehicle closure 102. Instead, according to one aspect, the drive mechanism 116 is operably connected to the upper roller assembly 140,140' such that actuation of the drive mechanism 116 causes the upper roller assembly 140,140' to move along the upper guide rail 110 in a front-to-rear direction. This, in turn, moves the lower roller assembly 142 along the lower guide rail 112. Because the upper roller assembly 140,140' supports the weight of the vehicle closure 102, the lower roller assembly 142 merely serves as a guide as the vehicle closure 102 moved between the closed position and the open position. To this end, the bracket assembly 150,250 of the upper roller assembly 140,140' is configured for attachment of a power door open motor cable 350 (FIGS. 1-3). Particularly, and as best depicted on the upper roller assembly 140', the second bracket 254 includes a cable attachment 352 provided on the first member 270. Again, in a manual mode, the vehicle closure 102 can be actuated through pulling on the handle. Further, and as shown in FIGS. 1-3, the upper guide rail 110 of the exemplary sliding vehicle closure system 100 includes an offset section 360, particularly an S-shaped offset section, adapted to lift the sliding vehicle closure 102 and move the sliding vehicle closure 102 laterally from the vehicle body structure 104 as the sliding vehicle closure is moved toward the open position.

As is evident from the foregoing, the proposed slide door system 100 eliminates the center rail and center rail gap by the use of the exemplary upper roller assembly 140,140'. With the upper roller assembly 140,140' for the upper guide rail 110, the vehicle closure 102 is able to open farther than in the normal three rail system and has better styling because the center rail gap is eliminated. The upper roller assembly 140, 140' is configured to follow the shape of the upper guide rail 110 without the need for special springs or other technology to control the movement of the assembly 140,140'. The upper roller assembly 140,140' includes the first bracket 152,252 having one end connected to a vehicle closure 102 and an opposite end coupled to the ball-type roller 190,290 associated with the ball bearing unit 200,300. Suspended beneath the ball bearing unit is the second bracket 154,254, which is rotatably relative to the first bracket 152,252. The plurality of guide rollers 230,330 are rotatably connected to the second bracket 154,254 and guide movement of the vehicle closure 102 during opening and closing thereof. The guide rollers 230,330 engage and move along the upper guide rail 110 which is reconfigured to have an I-shape in cross section. The guide rollers 230,330 of the upper roller assembly 140,140' are rotatable about a generally vertically oriented axis, and one of the guide rollers 330 of the upper roller assembly 140' is rotatable about a generally horizontally oriented axis.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An upper roller assembly for a sliding vehicle closure system, the sliding vehicle closure system being arranged to move a sliding vehicle closure between a closed position and an open position along an upper guide rail and a lower guide rail, the upper roller assembly comprising:

a first bracket secured to the sliding vehicle closure;
a ball-type roller secured to the first bracket at a location spaced apart from the sliding vehicle closure for engaging and moving along the upper guide rail during opening and closing of the sliding vehicle closure, the ball-type roller fixed in position relative to the sliding vehicle closure during opening and closing thereof;
a second bracket connected to first bracket, the second bracket being moveable relative to the sliding vehicle closure during opening and closing thereof; and
a plurality of guide rollers for guiding movement of the sliding vehicle closure during opening an closing thereof, the plurality of guide rollers being rotatably connected to the second bracket for engaging and moving along the upper guide rail during opening and closing of the sliding vehicle closure.

2. The upper roller assembly of claim 1, wherein the second bracket is suspended generally beneath the ball-type roller.

3. The upper roller assembly of claim 1, wherein the ball-type roller is part of a ball bearing unit mounted on the first bracket.

4. The upper roller assembly of claim 3, wherein the second bracket is connected to the ball bearing unit which allows the second bracket to rotate relative to the first bracket.

5. The upper roller assembly of claim 1, wherein the plurality of guide rollers includes at least one guide roller rotatable about a generally horizontally oriented axis and at least one guide roller rotatable about a generally vertically oriented axis.

6. The upper guide roller of claim 5, wherein the plurality of guide rollers includes three guide rollers rotatable about generally vertically oriented axes, two of the guide rollers having their axes aligned in a common plane and the third guide roller having its axis offset from the common plane.

7. The upper roller assembly of claim 6, wherein the guide roller rotatable about the generally horizontally oriented axis is positioned between the two guide rollers having their axes aligned in the common plane.

8. The upper roller assembly of claim 1, wherein the second bracket is a multi-piece second bracket including a first member connected to the first bracket, a second member connected to a first end portion of the first member and a third member connected to a second end portion of the first member, at least one guide roller is rotatably connected to the second member and at least one guide roller is rotatably connected to the third member.

9. The upper roller assembly of claim 8, wherein the second bracket includes a pair of third members connected to the second end portion of the first member, each third member having at least one guide roller rotatably connected thereto.

10. The upper roller assembly of claim 9, wherein the second bracket includes a fourth member connected to the second end portion of the first member and located between the pair of third members, at least one guide roller is rotatably connected to the fourth member.

11. The upper roller assembly of claim 10, wherein each of the at least one guide rollers located on the first and third members is rotatable about a generally vertically oriented axis, and the at least one guide roller located on the fourth member is rotatable about a generally horizontally oriented axis.

12. The upper roller assembly of claim 1 in combination with the sliding vehicle closure system, wherein the upper guide rail of the closure system has an I-shaped cross-section including an upper flange, a lower flange and a web separating the upper and lower flanges, the ball-type roller engages and moves along the upper flange during opening and closing of the sliding vehicle closure, at least one guide roller engages and moves along one of the upper flange and lower flange during opening and closing of the sliding vehicle closure, and at least one guide roller engages and moves along the web during opening and closing of the sliding vehicle closure.

13. The combination of claim 12, wherein at least one guide roller engages and moves along a first surface of the web and at least one guide roller engages and moves along a second surface of the web during opening and closing of the sliding vehicle closure.

14. The combination of claim 12, wherein the sliding vehicle closure system does not include a center rail, and the upper roller assembly is configured for attachment of a power door open motor cable.

15. The combination of claim 12, wherein the upper guide rail of the sliding vehicle closure system includes an offset section adapted to lift the sliding vehicle closure and move the sliding vehicle closure laterally from a vehicle body structure as the sliding vehicle closure is moved toward the open position.

16. An upper sliding assembly for a sliding vehicle closure system, the sliding vehicle closure system being arranged to move a sliding vehicle closure along a vehicle body structure between a closed position and an open position, the upper sliding assembly comprising:
an upper rail extending along the vehicle body structure; and
an upper roller assembly including:
a first bracket secured to the sliding vehicle closure;
a ball bearing unit secured to the first bracket at a location spaced apart from the sliding vehicle closure, the ball bearing unit including a ball-type roller for engaging and moving along the upper guide rail during opening and closing of the sliding vehicle closure, the ball-type roller fixed in position relative to the sliding vehicle closure during opening and closing thereof, the ball-type roller supporting the sliding vehicle closure relative to the vehicle body structure;
a second bracket connected to the ball bearing unit allowing the second bracket to rotate relative to the sliding vehicle closure during opening and closing thereof; and
a plurality of guide rollers for guiding movement of the sliding vehicle closure during opening and closing thereof, the plurality of guide rollers being rotatably connected to the second bracket for engaging and moving along the upper guide rail during opening and closing of the sliding vehicle closure, the plurality of guide rollers including at least one guide roller rotatable about a generally horizontally oriented axis and at least one guide roller rotatable about a generally vertically oriented axis.

17. The upper sliding assembly of claim 16, wherein the second bracket is a multi-piece bracket including a first member having an inverted U-shape, a second L-shaped member connected to first member closest to the sliding vehicle closure and a third backwards L-shaped member connected to the first member and spaced apart from the second member, wherein one of the guide rollers rotatable about the generally vertically oriented is mounted on the second member and another one of the guide rollers rotatable about the generally vertically oriented is mounted on the third member.

18. The upper sliding assembly of claim 17, wherein the third member includes a cutout and the second bracket further includes a fourth member connected to the first member and positioned in the cutout, wherein one of the guide rollers rotatable about the generally horizontally oriented axis is mounted to the fourth member.

19. The upper sliding assembly of claim 18, wherein the upper guide rail has an I-shaped cross-section including an upper flange, a lower flange and a web separating the upper and lower flanges, wherein the ball-type roller engages and moves along the upper flange during opening and closing of the sliding vehicle closure, the guide rollers mounted on the second and third members engage and move along the web during opening and closing of the sliding vehicle closure, and the guide member mounted on the fourth member engages and moves along the lower flange during opening and closing of the sliding vehicle closure.

20. The upper sliding assembly of claim 16, wherein the upper guide rail of the sliding vehicle closure system has an I-shaped cross-section and includes an offset section adapted to lift the sliding vehicle closure and move the sliding vehicle closure laterally from the vehicle body structure as the sliding vehicle closure is moved toward the open position.

21. A sliding vehicle closure assembly for a vehicle comprising:
   a sliding vehicle closure including a closure body;
   an upper guide rail secured to a vehicle body structure for guiding the sliding vehicle closure during opening an closing thereof, the upper guide rail having an I-shaped cross-section including an upper flange, a lower flange and a web separating the upper and lower flanges;
   a first bracket extending from an upper portion of the closure body;
   a ball-type roller is secured to the first bracket for engaging and moving along the upper guide rail during opening and closing of the sliding vehicle closure, the ball-type roller being rotatable about a generally vertically oriented axis and fixed in position relative to the sliding vehicle closure during opening and closing thereof, the ball-type roller supporting the sliding vehicle closure on the upper guide rail relative to the vehicle body structure;
   a second bracket positioned beneath the first bracket and rotatable relative to the first bracket via a ball-bearing unit connected to the first bracket; and
   a plurality of guide rollers for guiding movement of the sliding vehicle closure during opening an closing thereof, the plurality of guide rollers being rotatably connected to the second bracket for engaging and moving along the upper guide rail during opening and closing of the sliding vehicle closure,
   wherein the ball-type roller engages and moves along the upper flange during opening and closing of the sliding vehicle closure, at least one guide roller engages and moves along the lower flange during opening and closing of the sliding vehicle closure, and at least one guide roller engages and moves along the web during opening and closing of the sliding vehicle closure,
   wherein the upper guide rail includes an S-shaped offset section adapted to lift the sliding vehicle closure and move the sliding vehicle closure laterally from the vehicle body structure as the sliding vehicle closure is moved toward the open position.

\* \* \* \* \*